United States Patent [19]

Forslund

[11] Patent Number: 4,643,036
[45] Date of Patent: Feb. 17, 1987

[54] POWER TRANSMISSION DEVICE IN INDUSTRIAL ROBOTS

[75] Inventor: Karl-Erik Forslund, Västerås, Sweden

[73] Assignee: Asea AB, Västeras, Sweden

[21] Appl. No.: 734,196

[22] Filed: May 15, 1985

[30] Foreign Application Priority Data

May 18, 1984 [SE] Sweden ................................ 8402692

[51] Int. Cl.[4] .............................................. F16H 21/44
[52] U.S. Cl. ......................................... 74/105; 901/18;
901/23; 414/4; 414/917
[58] Field of Search .................... 414/4, 680, 729, 917;
74/89.15, 102, 105, 106; 901/18, 19, 23, 28, 29, 25

[56] References Cited

U.S. PATENT DOCUMENTS

| | | | |
|---|---|---|---|
| 4,052,906 | 10/1977 | Genini | 74/89.15 |
| 4,075,898 | 2/1978 | Carlson, Jr. | 74/89.15 |
| 4,250,762 | 2/1981 | Weatherby | 74/89.15 |
| 4,441,376 | 4/1984 | Tobey | 74/89.15 |
| 4,482,288 | 11/1984 | Rovetta | 414/4 X |

FOREIGN PATENT DOCUMENTS 3317261 12/1983 Fed. Rep. of Germany .

Primary Examiner—Robert J. Spar
Assistant Examiner—D. Glenn Dayoan
Attorney, Agent, or Firm—Watson, Cole, Grindle & Watson

[57] ABSTRACT

A power transmission device includes a rotatably mounted drive screw, a nut element which is movable along the drive screw, and a pair of links which connect the nut element to a driven member. The links are rigidly connected to each other by a torsionally stiff member to prevent relative angular movement therebetween.

3 Claims, 5 Drawing Figures

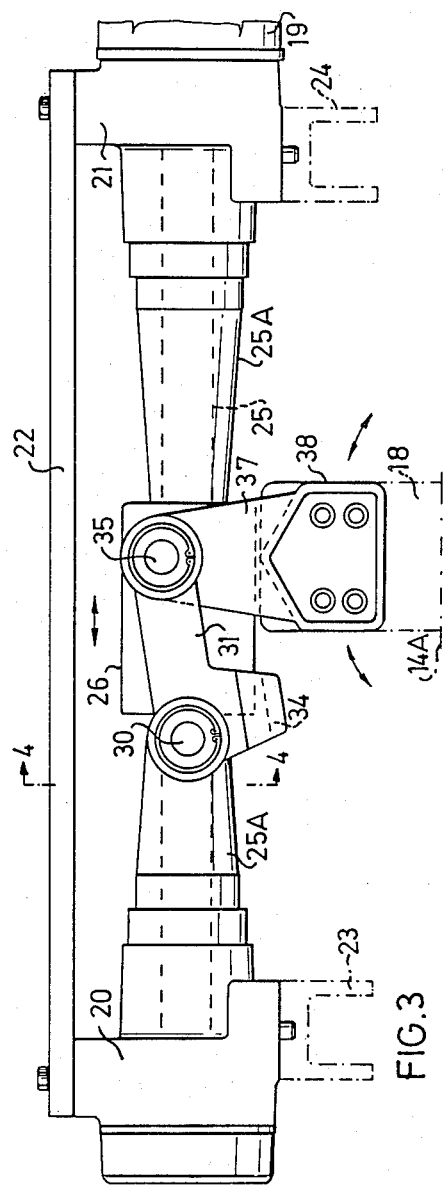
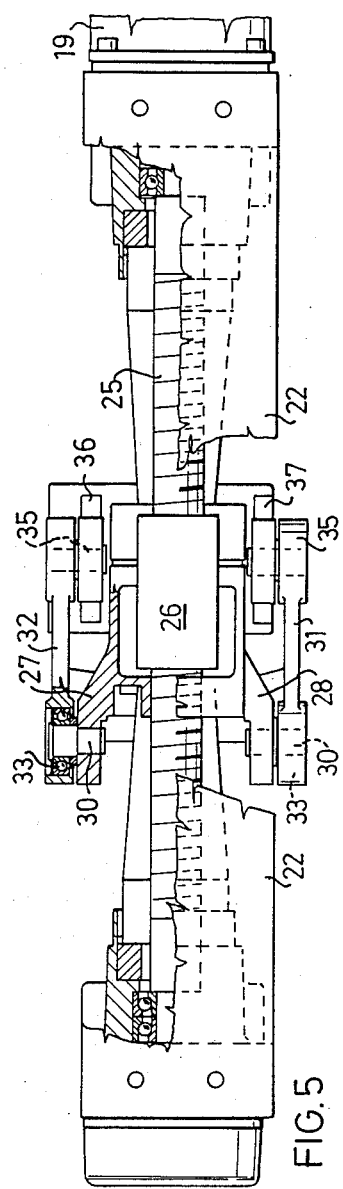

POWER TRANSMISSION DEVICE IN INDUSTRIAL ROBOTS

BACKGROUND OF THE INVENTION

1. Field of the Invention

The present invention relates to a power transmission device used in industrial robots, particularly pendulm robots.

2. The Prior Art

In transmitting power in an industrial robot to its positionable parts, it is increasingly required that there be no play between the members transmitting the power, i.e., in order to achieve the highest possible positioning accuracy. There is further a desire to be able to readily and quickly to replace different components as required, thus reducing any down time which may possibly occur.

A customary power means in industrial robots is a so-called ball screw which is rotated by a reversible and programmable electric motor. The ball screw is provided with a nut means connected to a driven member, which may execute different types of motion in one and the same plane as the screw. In a known device, the driven member is a pivoting arm, one end of which is connected to the nut means with the aid of two links, mounted on pins on either side of the nut means at one end of the link, and on pins on the driven member at the other end of the link. The mountings are usually ball bearings. However, when screw is rotated in one direction, there is a small scissoring movement in these links, i.e., their axes no longer have exactly the same angular orientation in thier mutually parallel planes. When the screw is rotated in the opposite direction, the links change their mutually relative positions so that there is a small angle in the opposite direction. The nut means is turned a small angle to a corresponding extent in one or the other direction, i.e., there is a certain amount of play. Since the mutually angular movements of the links incur undesired play in the power transmission, which in turn results in decreased positioning accuracy, this play should be reduced to a minimum. The most obvious known measure is to increase the length of the bearings, since the play disappears when the bearings are sufficiently long. However, such long bearings are voluminous since they form long projecting details requiring free space for their movements.

Another known method is to guide the nut means along a slide in a path parallel to the screw so that the nut is prevented from turning relative to the screw. The object of the present invention is therefore to provide the same result with considerably simpler means, namely to prevent the links from scissoring relative each other and causing the nut to be turned relative to the screw.

SUMMARY OF THE INVENTION

In accordance with the invention, the links are rigidly connected to each other by a torsionally stiff element, which eliminates the play in the power transmission in an extremely simple way, while the journalling length for the links can be kept short, which in turn permits a more compact design.

A suitable embodiment of the device in accordance with the invention is illustrated as an example on the accompanying drawings.

DESCRIPTION OF THE DRAWINGS

FIG. 3 is a side view of the device as a separate unit, FIG. 5 is a partially sectioned view seen from above.

DETAILED DESCRIPTION OF THE PREFERRED EMBODIMENT

Figure 1:
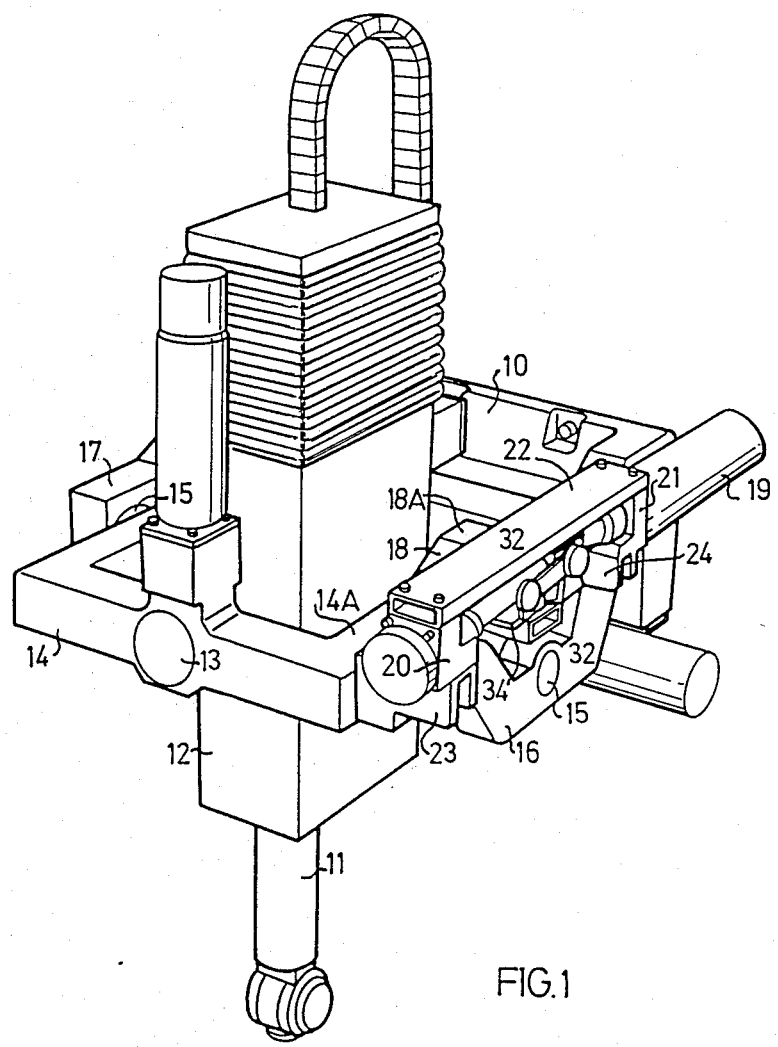
FIG. 1 is a schematic perspective view of an industrial (pendulum) robot with a power transmission device in accordance with the invention.
Figure 2:
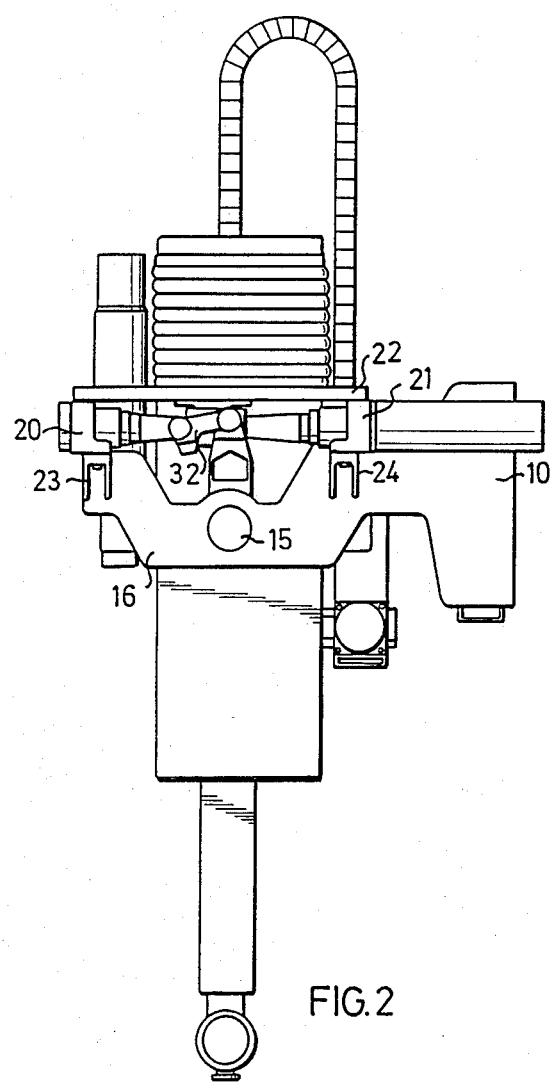
FIG. 2 is a side view thereof.

The robot has an attachment 10 for attaching to a column or the like. Its free working arm 11 is carried in a housing 12 which is provided with trunnion pins 13 for pivoting in a frame 14, which in turn is carried by trunnion pins 15 between two brackets 16,17, which are part of the attachment 10.

The frame 14 is provided with an arm 18 extending above the bracket 16 upwards from, and inclined to, one of the frame side members 14A, to form an operating arm 18A, with its upper end radially spaced from the trunnion pin 15, so that the frame 14 can be pivoted by this arm. The arm 18A is actuated with the aid of a reversible electric motor 19 via an inventive power transmission device.

Two bearing blocks 20,21 are formed into a unit with the aid of a bar 22, or a like element, and are removably attached to two brackets 23,24, projecting from bracket 16.

The motor drives a screw 25 which is journalled in the bearing blocks. A nut means 26 is mounted on the screw. The screw is suitably a known ball screw with a corresponding nut means for obtaining the least friction and least play. The screw is provided with protective bellows 25A or the like.

The nut means 26 has two arms 27,28 provided with pins 30 at the ends for mounting the ends of links 31,32 with the aid of ball bearings 33. These links are rigidly connected to each other by a torsionally stiff cross member 34, and thus form a rigid unit.

The opposite ends of the links are connected to two bracket arms 36,37 with the aid of pins 35 and ball bearings. The arms 36,37 are carried by a cross tube 38, one end of which is closed off by a wall 39, in which there are holes for screws intended for attaching the wall to the end of the arm 18A of the frame 14.

The arm 18A has an arcuate motion about an axis through the pins 15. The links 31,32 adjust themselves to this motion when the nut means 26 is moved in one or the other direction along the screw 25.

By the links being mutually rigidly connected to form a unit, relative angular movement between them is prevented, resulting in the nut means being prevented from turning relative the screw. The lengths of the bearings may thus be kept small, as will be seen from the Figure, where the bearing length is equal to the width of the ball bearing.

Figure 4:
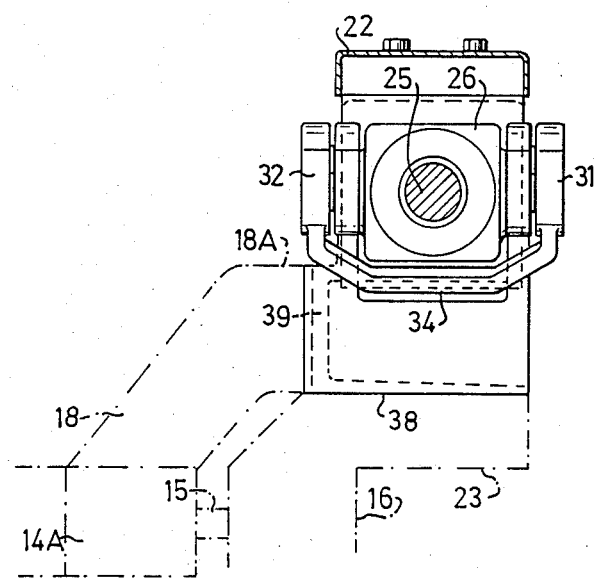
FIG. 4 is a section along the line 4—4 in FIG. 3.

From a servicing point of view it is an essential advantage that the device shown in FIGS. 3-5 is a separate unit which can easily be removed from the robot for replacement, thus enabling rapid exchange and short down time.

The narrow bearings, i.e., the ball bearings 33 for the links 31,32, result in the unit being extremely compact, while at the same time meeting the high demands for "no-play" power transmission.

The inventive device is particularly suitable for pendulum robots, of the kind such as illustrated on the drawings.

I claim:

1. In a power transmission device for use in industrial robots, said power transmission device including a rotatably mounted drive screw which is adapted to being rotated by a motor; a nut means which is mounted on said drive screw to be movable therealong in a plane when said drive screw is rotated, said nut means having arms on opposite sides which mount respective journalling pins which are parallel to one another; a driven member which is movable along a predetermined path in said plane; a pair of parallel links, each of said links having first and second ends, the first end of each of said links including a ball bearing which is rotatably mounted to a respective journalling pin and the second end of each of said links being connected to said driven member, the improvement wherein said power transmission device includes a torsionally stiff member rigidly connected between said parallel links so as to eliminate any relative angular displacement therebetween.

2. The power transmission device as defined in claim 1, including two spaced apart bearing blocks in which the opposite ends of said drive screw is rotatably mounted, and a bar rigidly connecting said bearing blocks to form a rigid unit which can be removably attached to the frame of a robot.

3. The power transmission device as defined in claim 2, wherein said driven member includes two spaced apart bracket arms and a cross tube connected between said bracket arms.

* * * * *